Open-loop system with compensator which incorporates short-time memory unit

Inventors
John F. Calvert
Tsung Wei Sze
By Mann, Brown and Hanemann
Attys.

Nov. 21, 1961 J. F. CALVERT ET AL 3,010,035

SHORT-TIME MEMORY DEVICES IN CLOSED-LOOP SYSTEMS

Filed Nov. 7, 1955 8 Sheets-Sheet 2

Fig. 2. Development of $D_x(j\omega)$ for sinusoidal command function

Inventors
John F. Calvert
Tsung Wei Sze
By Mann, Brown and Hansmann
Attys.

SHORT-TIME MEMORY DEVICES IN CLOSED-LOOP SYSTEMS

Open-loop system performance based on criterion associated with a step command function.

Inventors
John F. Calvert
Tsung Wei Sze
By Mann, Brown and Hansmann
Attys.

Fig. 4. Open-loop system performance based on critorion associated with sinusoidal command function.

Inventors
John F. Calvert
Tsung Wei Sze
By Mann, Brown and Hansmann Attys.

Fig. 5. Feedback schemes using element of gain K to obtain stabilizing system or improved performance.

Inventors
John F. Calvert
Tsung Wei Sze.
By Mann, Brown and Hanemann
Attys.

Fig. 6. Design with gain K in the feedbck path.

Inventors
John F. Calvert
Tsung Wei Sze
By Mann, Brown and Hansmann.
Attys.

Frequency Response of System Compensated by Feedback Using Memory Units in the Forward Path.

Inventors
John F. Calvert
Tsung Wei Sze
By Mann, Brown and Hansmann
Attys.

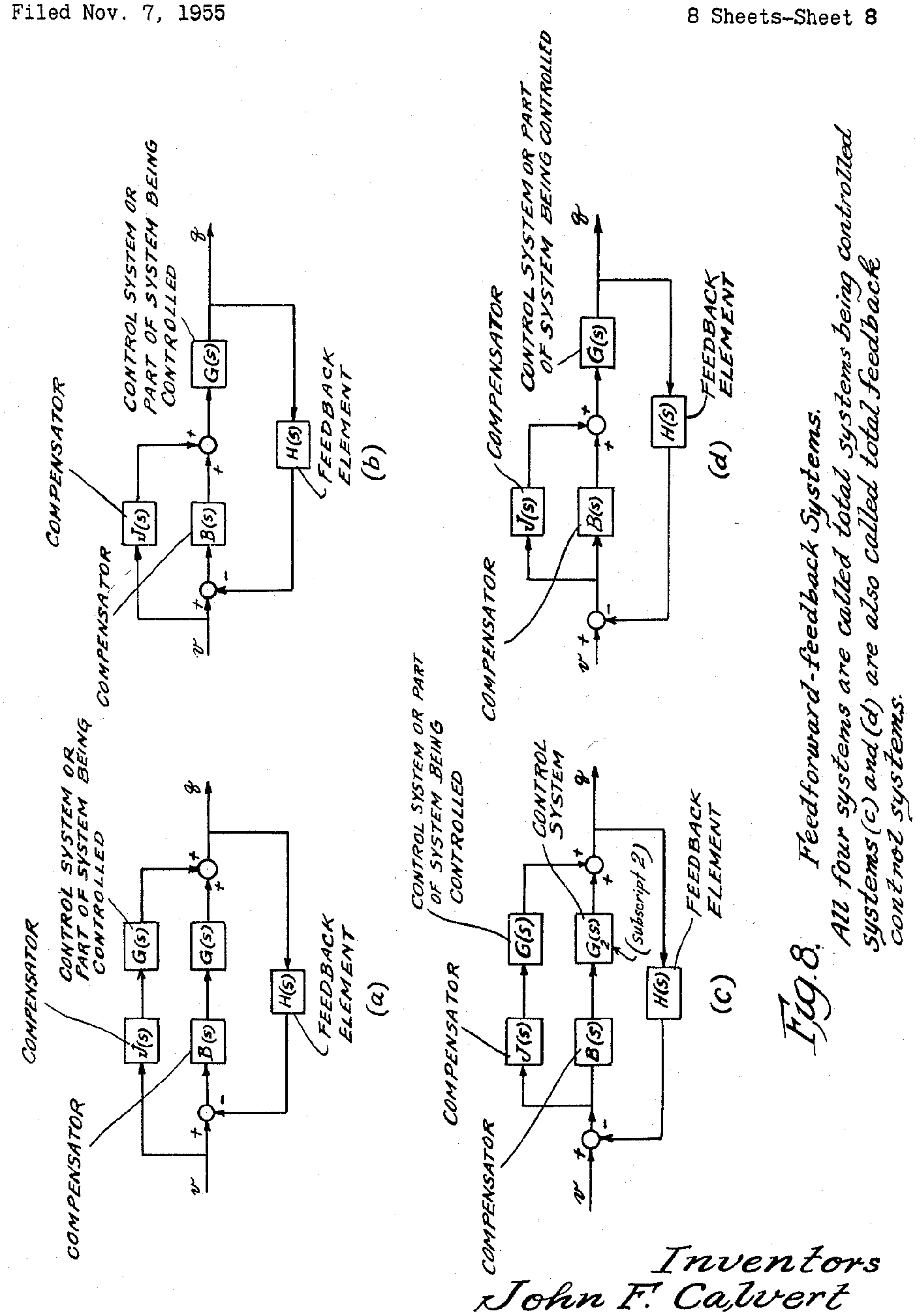
Fig. 8. Feedforward-feedback Systems.
All four systems are called total systems being controlled
Systems (c) and (d) are also called total feedback control systems.
Inventors
John F. Calvert
Tsung Wei Sze
By Mann, Brown and Hansmann,
Attys.

United States Patent Office 3,010,035 Patented Nov. 21, 1961

3,010,035
SHORT-TIME MEMORY DEVICES IN CLOSED-LOOP SYSTEMS

John F. Calvert and Tsung W. Sze, Pittsburgh, Pa., assignors to John F. Calvert, as trustee, Pittsburgh, Pa.
Filed Nov. 7, 1955, Ser. No. 545,224
9 Claims. (Cl. 307—152)

The present invention is concerned with the use of short-time memory devices in closed-loop systems and more particularly is concerned with follower type systems. The closed-loop systems may be of the simple feedback type or any of the various feedforward-feedback types.

Various types of short-time memory devices have been developed for use as compensators or lead networks in open-loop systems. Such arrangements have demonstrated that the band-width of any given control system is materially increased when the control system has a compensator including an appropriately designed short-time memory unit cascaded with it.

While such open-loop systems offered important advances in the control art, practical considerations limit their applicability to many control problems. For instance, the control system might contain non-linearities, such as arise from saturation effects, which cast serious doubt on the likelihood of obtaining satisfactory performance in any open-loop system predicated on linear theory. Experience has shown that saturation effects cause undesirable bias errors in the output. Even in the case of a linear control system, the parameters of the system may not be known with sufficient accuracy to permit designing a fully adequate compensator and here again bias errors will appear in the output.

The presence of these bias errors seemed to suggest the necessity of a feedback system; however, the short-time memory units introduce a plurality of discrete time delays which would be literally built into the closed-loop arising from the use of feedback. The introduction of these discrete time delays in a feedback system was considered impossible in view of steady state stability problems which would necessarily arise.

The principal object of the invention is to provide a stable feedback arrangement for control systems which include compensators of the short-time memory unit type and which are characterized by the fact that they introduce discrete time delays into the system.

It is proposed to provide a range of stable feedback arrangements for such systems and it will also be shown that conditions for stability are not materially altered either by the particular nature of the short-time memory unit employed or by the accuracy in the design of the unit or by non-linearities in the system.

An important feature of the invention resides in the fact that the use of feedback not only corrects bias errors but actually improves the overall performance of the system and the invention proposes to provide a specific feedback arrangement such that optimum performance of the control system is realized.

Other objects and advantages will become apparent during the course of the following description.

In the accompanying drawings forming a part of this specification and in which like numerals are employed to designate like parts throughout the same:

Figure 1:
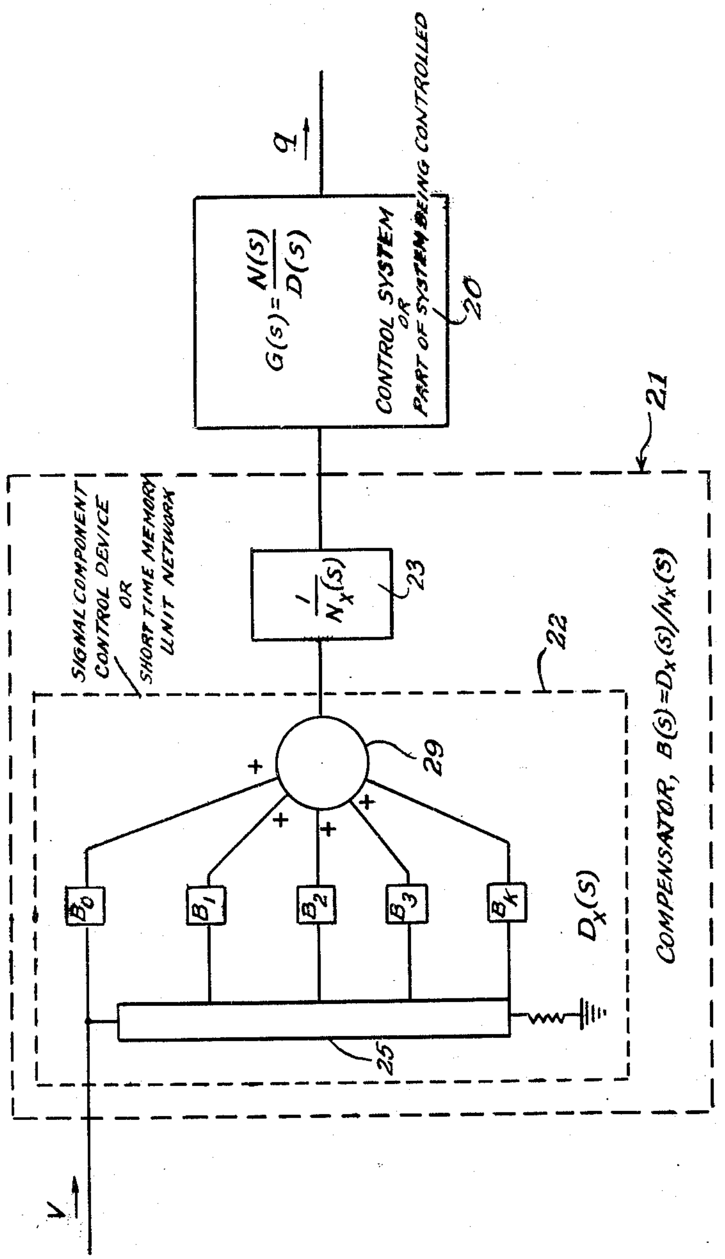
FIG. 1 is a block diagram of an open-loop control system having a compensator which includes a short-time memory unit designed on the basis of a step-command function.
Figure 5:
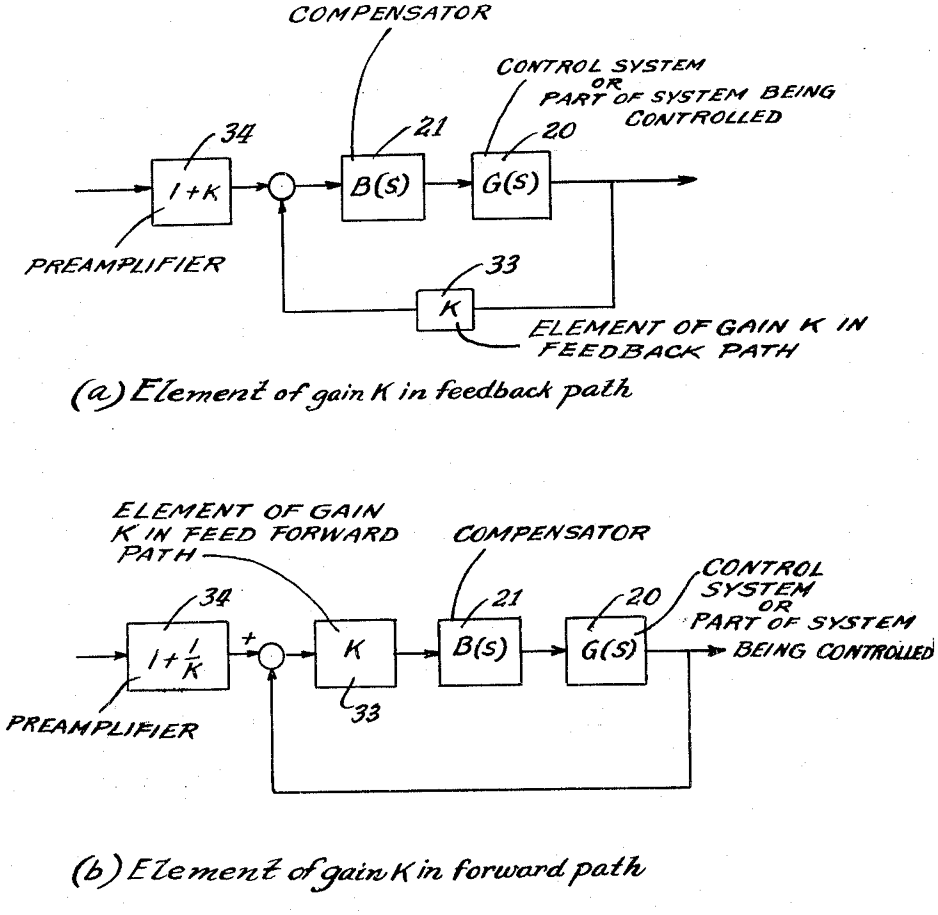
Figure 6:
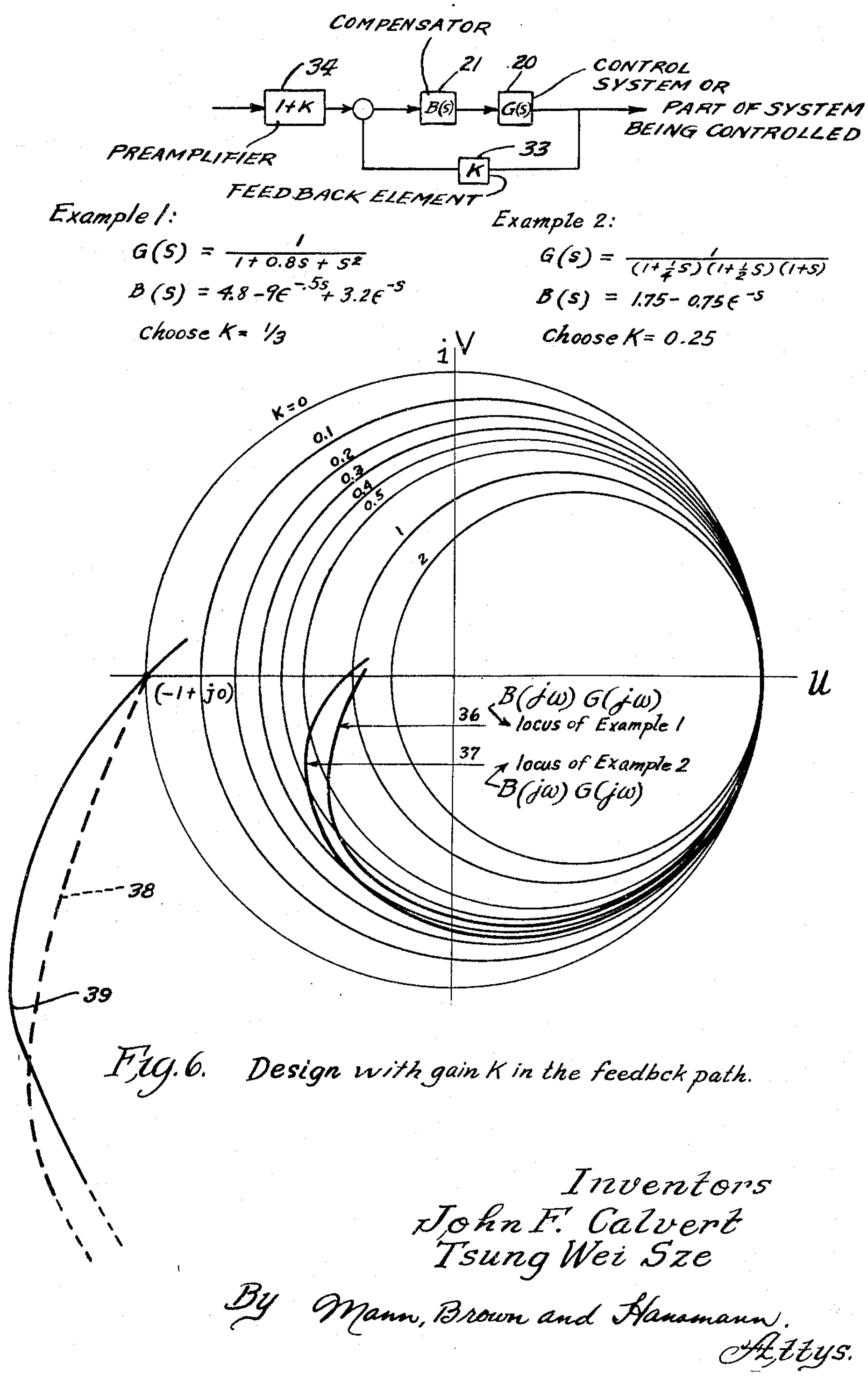
Figure 7:
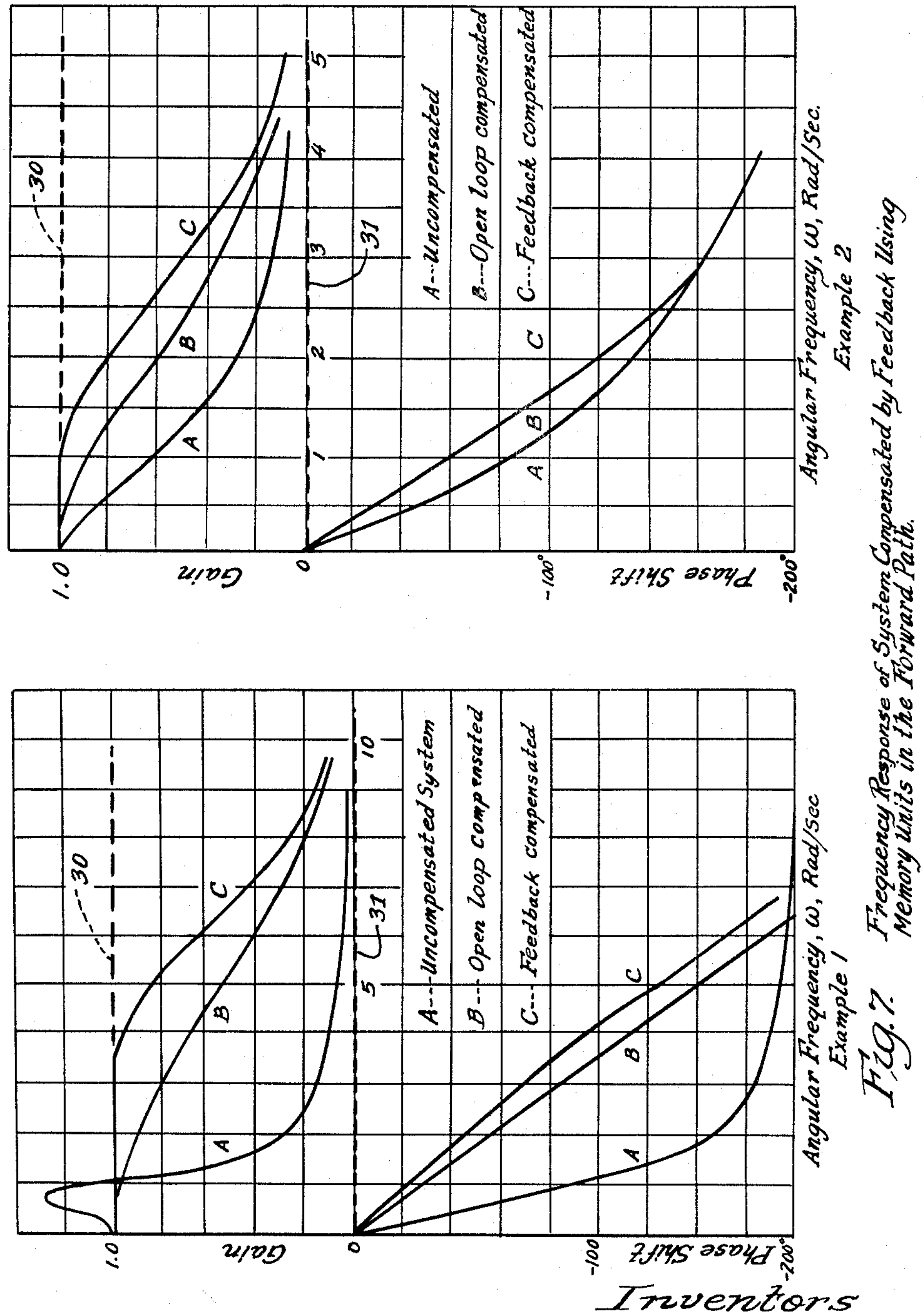

FIGS. 5(*a*) and 5(*b*) are block diagrams of closed-loop control systems employing feedback and having compensators including short-time memory units of any suitable design;

FIG. 6 is a graphical method of obtaining optimum gain in the feedback path for the closed-loop systems of FIG. 5;

FIG. 7 is graph of the performance characteristics of the open-loop system of FIG. 1, (A) when uncompensated, (B) when open-loop compensated, and (C) when feedback compensated; and FIGS. 8(*a*), 8(*b*), 8(*c*) and 8(*d*) are block diagrams of various forms of feedforward-feedback systems having compensators including short-time memory units of any suitable design.

The AIEE symbols and definitions for feedback control systems proposed in the AIEE committee report, entitled "Proposed Symbols and Terms for Feedback Control Systems," and Electrical Engineering, vol. 70, October 1951, pp. 905–909, will be employed throughout this disclosure, except as hereinafter indicated.

*Short time memory units as compensators in open-loop systems*

It is important to an understanding of the invention that certain considerations and underlying assumptions respecting the physical characteristics of the control systems and associated networks be set forth at the outset.

A list of symbols employed in this disclosure is appended to the end of the description for convenient reference.

Referring now to FIG. 1, there is shown, in block diagram, an open-loop system comprising a part of the system being controlled 20 represented by the function G($s$) and a compensator 21 represented by the function B($s$). The time varying input to the system is designated $v(t)$ and the output $q(t)$. The corresponding La Place transforms are $v(s)$ and $q(s)$, respectively.

Thus:

$$q(s)=B(s)G(s)v(s) \qquad (1)$$

Since any physical lumped constant system contains both numerator and denominator terms the function G($s$) can be written $$\frac{N(s)}{D(s)}$$

and this control system will be assumed as given and unalterable.

Assuming that the object of the control system is to make the output conform to the input, the function B(s) should approximate, as closely as possible, $$\frac{D(s)}{N(s)}$$

To achieve this the compensator consists of a short-time memory unit network 22 and a passive network 23 represented by the function $$\frac{1}{N_x(s)}$$

It will be assumed that a linear passive network can be designed such that its transfer function is $$\frac{1}{N_x(s)}$$

where $N_x(s)=N(s)$. The manner of designing such a network is well known to those skilled in the art and in the case of an electrical system a 4 terminal ladder network would be employed. Similarly the short-time memory unit network 22 is represented by the function $D_x(s)$ where $D_x(s)\approx D(s)$.

Finally it will be assumed that the individual functions N(s), D(s), and $N_x(s)$ are polynomials. They are rational and analytic in the finite domain of $s$. They contain no poles in this region, and it will be assumed that they arise from physical systems of such form that, as individual functions, they contain no zeros in the right half of the $s$ plane.

It will be observed that the function $D_x(s)$ is a transcendental function and is analytic in the finite $s$ domain. It possesses in this area no poles and, in any finite area it possesses, at most, a finite number of zeros.

Thus Equation 1 can be written $$q(s)=D_x(s)\left[\frac{1}{N_x(s)}\right]\left[\frac{N(s)}{D(s)}\right]v(s) \qquad (2)$$

where $$N(s)=b_0+b_1s+b_2s^2+\dots+b_ms^m$$
$$D(s)=a_0+a_1s+a_2s^2+\dots+a_ns^n$$
$$N_x(s)=b_0^1+b_1^1s+b_2^1s^2+\dots+b_m^1s^m$$
$$D_x(s)=B_0+B_1\epsilon^{-T_1S}+B_2\epsilon^{-T_2S}+\dots+B_k\epsilon^{-T_kS}$$

and in which $$b_0\approx b_0^1,\ b_1\approx b_1^1,\ \dots,\ b_m\approx b_m^1 \text{ and } k\geqq n\geqq m$$

where the symbol $\approx$ means approximately equal to, and where these and the parameters $B_0$, $B_1$, $B_2$, . . ., $B_k$, are all finite real numbers.

Output may be made to conform to the input by designing the short-time memory unit network 22 such that the transcendental expression $D_x(s)\approx D(s)$ which is a polynomial expression.

The present invention is not limited to the use of any specific type of short-time memory unit and to make this more evident two different design approaches are developed in brief outline. It will be shown that feedback can be applied to open-loop systems employing either form of compensator.

*Polynomial command function.*—This approach is outlined in considerable detail in the application entitled "Method and Apparatus for Control of System Output in Response to System Input," filed October 27, 1952, Serial No. 317,118 in the names of John F. Calvert (a coinventer of the present application) and Donald J. Gimpel, and now matured into U.S. Patent 2,801,351, and this disclosure, to the extent that it is not inconsistent, is specifically incorporated by reference. For completeness, however, the techniques employed therein are outlined hereinafter.

In this approach it is assumed that the command function, $v(t)$, was representable, at least over successive short periods, by a polynomial in time. The performance criteria selected concerning the output, $q(t)$, is that after action is initiated, $q(t)$ can be completely defined by the following components:

(1) At every instant of time, $q(t)$ will contain a component which is identical with the polynomial $v(t)$;

(2) For all time after a specified period (which is usually taken equal to or less than one half the longest natural period of oscillation of the control system) all periodic errors will reduce to and remain at zero;

(3) Within the same period of time (if $v$ contained more than just a constant term) all aperiodic errors will reduce to and remain at zero.

These criteria lead to the design equations for $D_x(s)$. However, in the illustration to follow the polynomial input will be reduced to its simplest form, i.e., a step input and, in consequence, no aperiodic error is to be encountered and the third criteria becomes meaningless.

Thus:

$$D(s)=a_n(s-\mu_1)(s-\mu_2)\dots(s-\mu_n) \qquad (3)$$

where $\mu_1, \mu_2, \dots \mu_n$ are the roots of $D(s)=0$.

From Equation 2, letting $k=n$, $$D_x(s)=B_0+B_1\epsilon^{-T_1S}+B_2\epsilon^{-T_2S}+\dots+B_n\epsilon^{-T_nS} \qquad (4)$$

To satisfy the second criterion stated above, the following relations are introduced.

$$\left.\begin{array}{l} B_0+B_1\epsilon^{-\mu_1T_1}+B_2\epsilon^{-\mu_1T_2}+\dots+B_n\epsilon^{-\mu_1T_n}=0 \\ B_0+B_1\epsilon^{-\mu_2T_1}+B_2\epsilon^{-\mu_2T_2}+\dots+B_n\epsilon^{-\mu_2T_n}=0 \\ \dots\dots\dots\dots\dots\dots\dots\dots \\ B_0+B_1\epsilon^{-\mu_nT_1}+B_2\epsilon^{-\mu_nT_2}+\dots+B_n\epsilon^{-\mu_nT_n}=0 \end{array}\right\} \qquad (5A)$$

Equation 5A contains $n$ equations with $n+1$ unknowns. To satisfy the first criterion above, the Final Value Theorem is employed to state that, for a step input, $$\left.\begin{array}{l} \lim_{s\to 0} \dfrac{s(B_0+B_1\epsilon^{-T_1S}+\dots+B_n\epsilon^{-T_nS})}{s(a_0+a_1s+\dots+a_ns^n)}=1 \\ \text{From which,} \\ B_0+B_1+B_2+\dots+B_n=a_0 \end{array}\right\} \qquad (5B)$$

For the case of a step input, (5a) and (5b) form the design equations, in which $T_1$, $T_2$, . . ., $T_n$ are to be selected and then $B_0$, $B_1$, $B_2$, . . ., $B_n$ are computed. These are the design equations for the short-time memory unit for the step input and the criteria set forth above.

*Sinusoidal command function.*—Here, it will be assumed that the command function, $v(t)$, is sinusoidal. This time the criteria for the controlled variable, $q(t)$ are concerned only with the steady state response, as follows;

(1) The amplitude of the controlled variable, $q(t)$, when plotted vs. frequency will be of a desired shape, and usually this is taken to be nearly flat over a wider frequency band than was the case for the control system alone, regardless of the design of the latter.

(2) Some angular lag will be accepted for $q(t)$ with respect to $v(t)$. Usually, the design will be such that a linear phase lag results, because for a follower system this means a delayed output but one which was not distorted in the process.

These criteria lead to the design equations for $D_x(s)$, here written as $D_x(j\omega)$. In this development D(s), herewritten as $D(j\omega)$, is established in polynomial form.

$$D(j\omega)=a(\omega)+jb(\omega) \qquad (6)$$

where $$a(\omega)=a_0-a_2\omega^2+a_4\omega^4-\dots+(-1)^{n/2}a_n\omega^n$$
$$b(\omega)=a_1\omega-a_3\omega^3+a_5\omega^5-\dots+(-1)^{n/2-1}a_{n-1}\omega^{n-1}$$

assuming, here, that $n$ is an even number.

Next $D_x(j\omega)$ is written as the product of two terms. The first provides only the linear phase lag. The second provides a function which will be made to nearly match $D(j\omega)$ over as wide a frequency band as seems practicable (in terms of saturation and other limitations of real equipment). To permit writing $D_x(j\omega)$ in this form, the short time memory unit network must be arranged in a particular manner and reference should be had to FIG. 2 wherein a delay line 25 is provided with a center tap 26 and additional pairs of taps arranged symmetrically about this center point. One such pair of taps is shown at 27 and 28. Each of the taps includes amplification means as indicated.

Since control systems should provide as rapid a response as possible, it is desired that $T_d$, the total time delay of the memory unit 25 be equal to or less than one half the longest natural period of oscillation of the control system.

A summing device 29 is connected to the various taps and the signal appearing at the output of this device for an input signal $v(j\omega)$ is termed the reference input:

$$\left[B_{a_0}\epsilon^{-j\frac{T_d}{2}\omega}+\frac{1}{2}(B_{a_1}+B_{b_1})\epsilon^{-j\frac{T_d}{2}\omega}.\epsilon^{+jT_1\omega}+\frac{1}{2}(B_{a_1}-B_{b_1})\epsilon^{-j\frac{T_d}{2}\omega}.\epsilon^{-jT_1\omega}\right]v(j\omega)$$

or $$\epsilon^{-j\frac{T_d}{2}\omega}\left[B_{a_0}+\frac{1}{2}B_{a_1}(\epsilon^{+jT_1\omega}+\epsilon^{-jT_1\omega})+\frac{1}{2}B_{b_1}(\epsilon^{+jT_1\omega}-\epsilon^{-jT_1\omega})\right]v(j\omega)$$

or $$\epsilon^{-j\frac{T_d}{2}\omega}[B_{a_0}+B_{a_1}\cos(T_1\omega)+jB_{b_1}\sin(T_1\omega)]v(j\omega) \qquad (7)$$

Figure 2:
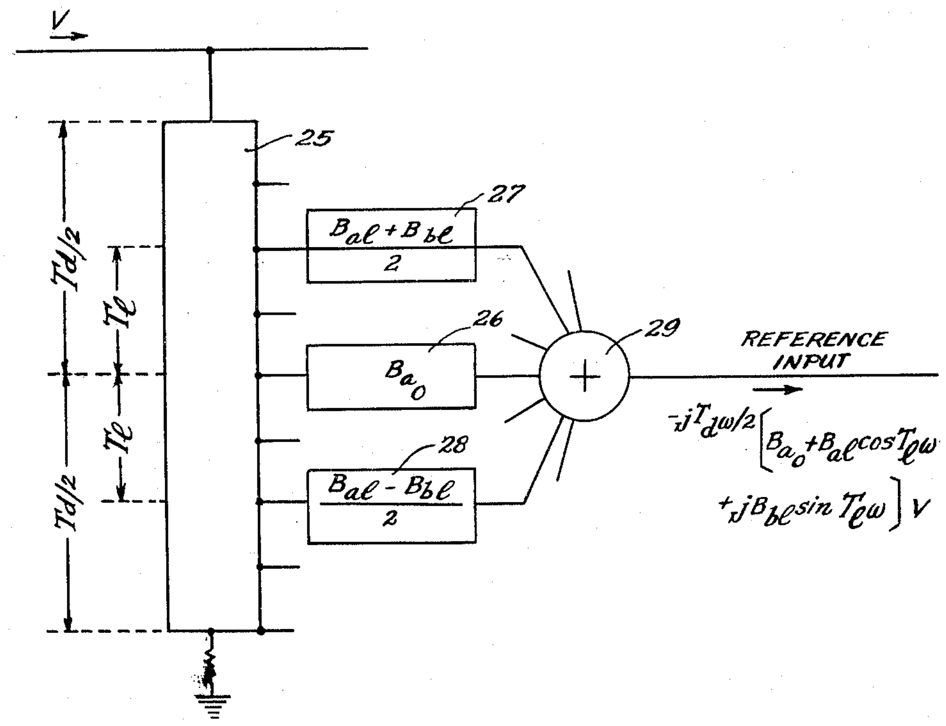
FIG. 2 is a schematic diagram of a short-time memory unit designed on the basis of a sinusoidal command function that may replace the short-time memory unit of FIG. 1.

Thus the delay unit as connected in FIG. 2 can be described by the following general expression.

$$D_x(j\omega)=\epsilon^{-j\frac{T_d}{2}\omega}[A(\omega)+jB(\omega)] \qquad (8)$$

where $$A(\omega)=B_{a_0}+B_{a_1}\cos T_1\omega+B_{a_2}\cos T_2\omega+\ldots+B_{a_k}\cos T_k\omega$$

$$B(\omega)=B_{b_1}\sin T_1\omega+B_{b_2}\sin T_2\omega+\ldots+B_{b_k}\sin T_k\omega$$

The product term $$\epsilon^{-j\frac{T_d}{2}\omega}$$

represents that a slight angular lag, linear with frequency, is introduced into the system and is in accordance with the second criteria above.

From a comparison of Equations 6 and 8, it will be seen that the first criteria is satisfied by making $$A(\omega)\approx a(\omega)$$

$$B(\omega)\approx b(\omega)$$

A good representation with a small time delay can be accomplished successfully only with a modified Taylor's Series type of compensator (TSC). This design is carried out by expanding the trigonometric terms of Equations 8 into infinite series form in powers of $\omega$. Since $A(\omega)$ contains only cosine terms, the series expansions will yield even powered terms. The coefficients resulting from the expansion of a plurality of cosine terms are grouped in powers of $\omega$ and equated to the coefficients $a_0$, $a_2$, etc. of Equation 6. $B(\omega)$ is treated similarly.

It should be noted that the expressions of Equation 6 contain a finite number of terms whereas the expansions of the trigonometric terms contain an infinite number of terms. The compensator may be improved by summing a certain number of additional coefficients of $\omega$ in the expansions of Equation 8 to zero.

The procedures outlined above are well known and for brevity the details are omitted and only the resulting design equations for the short-time memory unit are shown hereinafter as Equation 9. These are the design equations for a short-time memory unit when a sinusoidal input is assumed and the second set of criteria are employed. In the use of these equations, the values of the T's are chosen and the values of the B's are computed.

It will be observed that $k$ is an even integer and greater than $n$.

$$\left\{\begin{array}{l}
B_{a_0}+B_{a_1}+B_{a_2}+\ldots+B_{a_k}=a_0 \\
T_1^2B_{a_1}+T_2^2B_{a_2}+\ldots T_k^2B_{a_k}=(2!)a_2 \\
\ldots\ldots\ldots\ldots\ldots\ldots\ldots\ldots \\
T_1^nB_{a_1}+T_2^nB_{a_2}+\ldots+T_k^nB_{a_k}=(n!)a_n \\
T_1^{n+2}B_{a_1}+T_2^{n+2}B_{a_2}+\ldots+T_k^{n+2}B_{a_k}=0 \\
\ldots\ldots\ldots\ldots\ldots\ldots\ldots\ldots \\
T_1^kB_{a_1}+T_2^kB_{a_2}+\ldots+T_k^kB_{a_k}=0 \\
T_1B_{b_1}+T_2B_{b_2}+\ldots+T_kB_{b(k-1)}=(1!)a_1 \\
T_1^3B_{b_1}+T_2^3B_{b_2}+\ldots+T_k^3B_{b(k-1)}=(3!)a_3 \\
\ldots\ldots\ldots\ldots\ldots\ldots\ldots\ldots \\
T_1^{n-1}B_{b_1}+T_2^{n-1}B_{b_2}+\ldots+T_k^{n-1}B_{b(k-1)}=(n-1)!a_{n-1} \\
T_1^{n+1}B_{b_1}+T_2^{n+1}B_{b_2}+\ldots+T_k^{n+1}B_{b(k-1)}=0 \\
\ldots\ldots\ldots\ldots\ldots\ldots\ldots\ldots \\
T_1^{k-1}B_{b_1}+T_2^{k-1}B_{b_2}+\ldots+T_k^{k-1}B_{b(k-1)}=0
\end{array}\right. \qquad (9)$$

Figure 3:
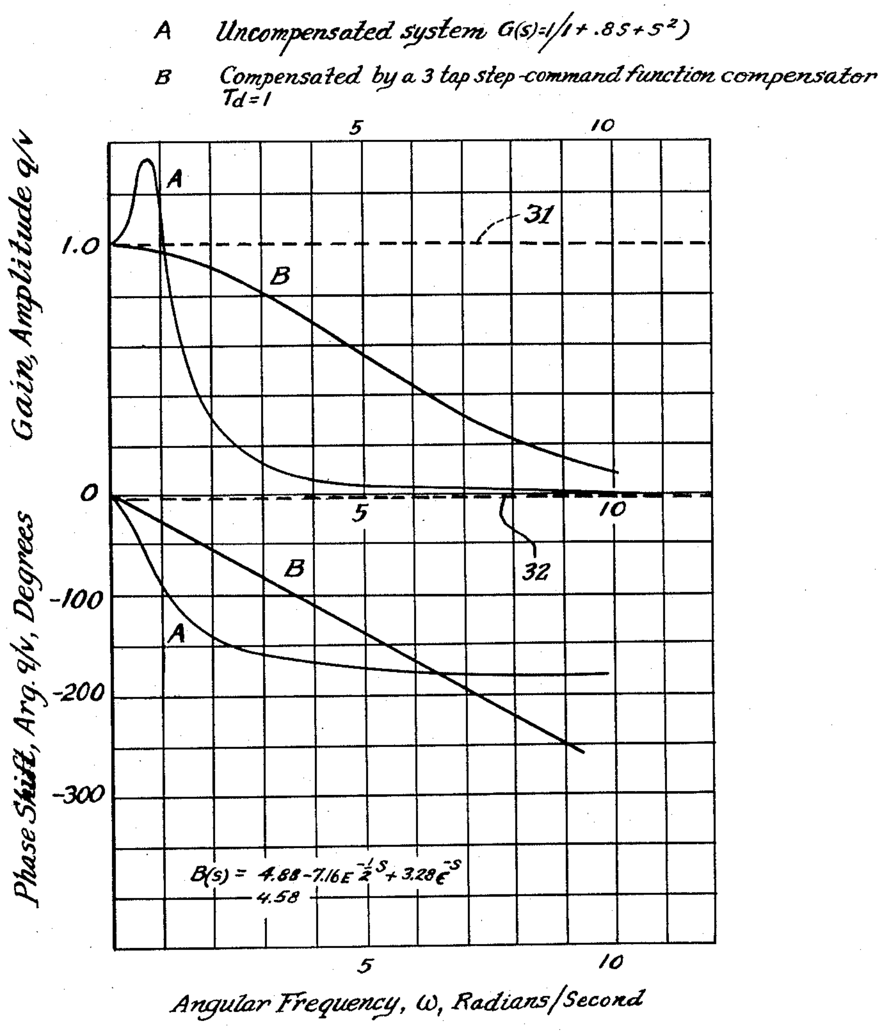
FIG. 3 is a comparison graph of the performance characteristics of the open-loop system of FIG. 1, (A) when uncompensated, and (B) when compensated with a short-time memory device of the FIG. 1 type.
Figure 4:
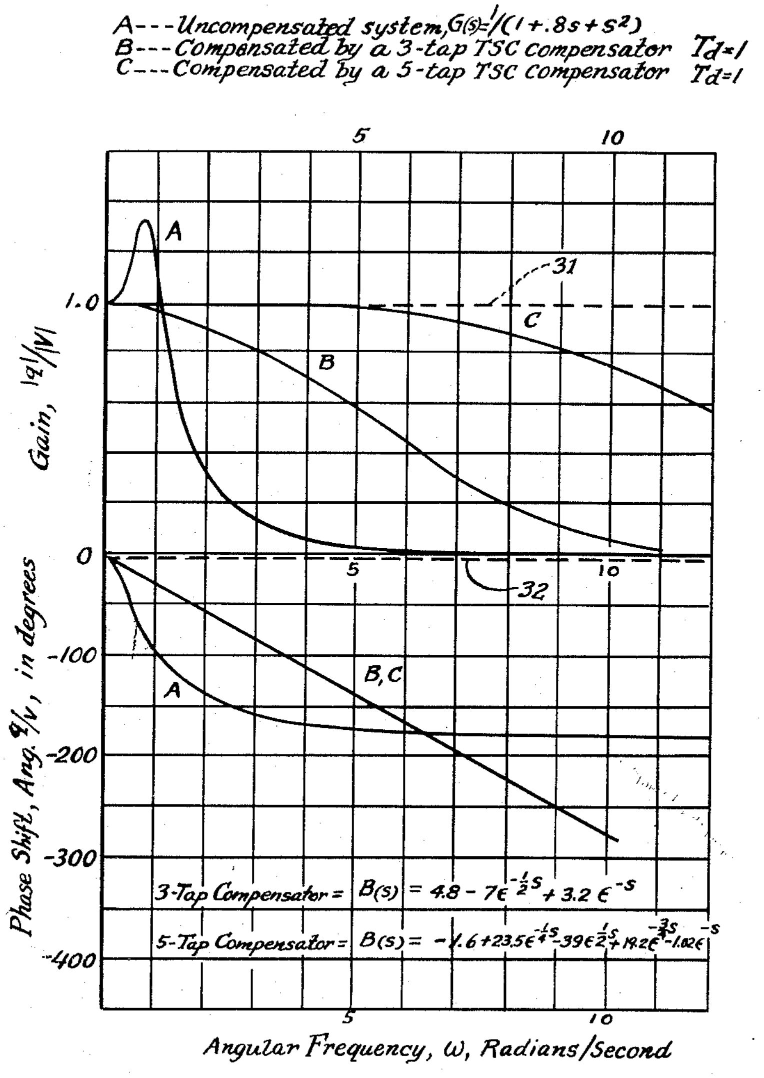
FIG. 4 is a comparison graph of the performance characteristics of the open-loop system of FIG. 1, (A) when uncompensated, (B) when compensated with a short-time memory device of the FIG. 1 type and (C) when compensated with a short-time memory device of the FIG. 2 type.

The calculated performance for open-loop systems based respectively on a polynomial command function and a sinusoidal command function are shown in FIGS. 3 and 4. Each figure includes a chart of amplitude versus frequency and phase shift versus frequency and ideal curves in each respect are shown dotted and designated 31 and 32 in both FIG. 3 and FIG. 4. The improvements effected by the short-time memory units are self evident from a comparison of the curves.

*Feedback systems employing short-time memory devices*

In practice, as mentioned previously, it is frequently difficult to obtain the indicated theoretical performance from open-loop systems having short-time memory loop compensators and the present invention teaches the manner of applying feedback to such systems, not only to avoid bias errors but also to effect a material improvement in performance.

FIGS. 5(*a*) and 5(*b*) illustrate alternative circuit arrangements having an element of gain K. The part of the system being controlled is again designated 20 and the compensator 21. The element 33 introduces the feedback gain K into the circuit and a preamplifier 34 compensates for the loss of gain occasioned by the feedback arrangement.

Both circuits have the identical transfer function, $F(s)$, where, $$\left.\begin{array}{l}
q(s)=[F(s)]v(s) \\
F(s)=(1+K)\dfrac{B(s)G(s)}{1+KB(s)G(s)} \\
F(s)=(1+K)\left[\dfrac{D_x(s)N(s)}{N_x(s)D(s)\left[1+\dfrac{KD_x(s)N(s)}{N_x(s)D(s)}\right]}\right]
\end{array}\right\} \qquad (10)$$

where the factor $(1+K)$ compensates for the loss of gain, and $$\left.\begin{array}{l}
G(s)=N(s)/D(s) \\
B(s)=D_x(s)/N_x(s)
\end{array}\right\} \qquad (10a)$$

The terms on the right hand side of Equation 10*a* are as defined in Equation 2; and K is a positive real number.

Until the present invention, no method was known for applying feedback to such a system without creating instability problems. Nyquist developed criteria concerning the stability of conventional feedback systems (see H. Nyquist, Regeneration Theory, Bell System Tech. J. 11, 126, January 1932) but such systems do not involve the expressions $D_x(s)$ and $N_x(s)$ as in the present case. To resolve the questions of stability arising from the application of feedback as shown in FIGS. 5(*a*) and 5(*b*) it is necessary to extend Nyquist's techniques to adapt them to the specific systems at hand.

It is pertinent to point out that in the present case $D_x(s)$ is a transcendental expression whereas in Nyquist's development all of the expressions are polynomials. It is also important to note that in the following development $D_x(s)$ may be determined in various ways as indicated hereinbefore just so $D_x(s) \approx D(s)$.

Use is also made of the assumptions outlined in connection with the open-loop system of FIG. 1. It is seen, therefore, that in the finite doman of $s$, $[D_x(s)N(s)]$ and $[N_x(s)D(s)]$ provide no poles; and in accord with these assumptions, provide no zeros in the right half plane of $s$.

From Equation 10 therefore, stability is achieved if no zeros are provided in the right half plane of $s$ by the function $$f(s)=[1+KB(s)G(s)]=\left[1+\frac{KD_x(s)N(s)}{N_x(s)D(s)}\right] \quad (11)$$

Since, each term on the right is analytic and possesses the characteristics first cited, Cauchy's integral theorem may be modified to state: The integral, $$\left(\frac{1}{2\pi j}\right)\int c[f'(s)/f(s)]ds$$

taken in a positive sense around the boundary, $c$, of the right half plane of $s$, is equal to the number of zero points of $f(s)$ lying within the enclosed domain, each being counted a number of times equal to its order.

In general, between any two points $s_a$ and $s_b$ $$\frac{1}{2\pi j}\int_{s_a}^{s_b}[f'(s)/f(s)]ds=\frac{-j}{2\pi}\ln\frac{|f(s_b)|}{|f(s_a)|}+\frac{1}{2\pi}(\psi_b-\psi_a) \quad (12)$$

When the integral is taken around a simple closed path, $|f(s_b)|=|f(s_a)|$, the first term on the right of Equation 12 becomes zero and the second is equal to the integral number of revolutions of $f(s)$ made in traversing the closed path C.

Consider a D-shaped closed path made up of the imaginary axis plus a semicircular path lying in the right half plane with center at the origin. Let, $s=re^{j\theta}$. It is noted, then, $$\operatorname*{Limit}_{r\to\infty} D_x(s)\leqq|B_0|+|B_1|+|B_2|+\ldots+|B_k| \quad (13)$$

$$=\text{a finite real value}$$

$$\operatorname*{Limit}_{r\to\infty}\left|\frac{N(s)}{N_x(s)}\right|=\operatorname*{Limit}_{r\to\infty}\left|\frac{\sum_{l=0}^{l=m} b_l r^l \epsilon^{jl\theta}}{\sum_{l=0}^{l=m} b_l' r^l \epsilon^{jl\theta}}\right|=\left|\frac{b_m}{b_m'}\right|\approx 1 \quad (14)$$

$$\operatorname*{Limit}_{r\to\infty}|D(s)|=\operatorname*{Limit}_{r\to\infty}\left|\sum_{l=0}^{l=n} a_l r^l \epsilon^{jl\theta}\right|=+\infty \quad (15)$$

Considering the semi-circular path, there is some finite value, R, such that for $r>R$ and $$\frac{\pi}{2}\geqq\theta\geqq\frac{-\pi}{2}\ \left|\frac{D_x(s)N(s)}{N_x(s)D(s)}\right|<1 \quad (16)$$

Then in view of Equations 10 and 16;

$$2>|f(s)|>0 \quad (17)$$

Hence, for $r>R$, the function $f(s)$ has no poles or zeros on the imaginary axis or in the right half plane. Therefore, as $r$ increases beyond R, the path of integration for $\int_c[f'(s)/f(s)]\,ds$ will go through no singular points.

Furthermore, $$f(r\epsilon^{j\theta})=1+A_m\epsilon^{j} \quad (18)$$

where $$A_m\epsilon^{j\varphi}=\frac{D_x(r\epsilon^{j\theta})N(r\epsilon^{j\theta})}{N_x(r\epsilon^{j\theta})D(r\epsilon^{j\theta})}$$

As $r$ approaches infinity, we see that, $$\operatorname*{Limit}_{r\to\infty} A_m=0 \quad (19)$$

and $$\operatorname*{Limit}_{r\to\infty} f(s)=1+(0+j0)=1 \quad (20)$$

In consequence, along the semi-circular path as $r\to\infty$ $(\varphi_b-\varphi_a)$ approaches zero, and nothing is contributed to the total integral around the right half plant of $s$.

Therefore (just as in the systems dealt with by Nyquist where $N_x(s)$ and $D_x(s)$ were not employed (it is possible to write for the present system, $$\frac{1}{2\pi j}\int_c\left[\frac{f'(s)}{f(s)}\right]ds=\frac{1}{2\pi j}\int_{j\omega=-j\infty}^{j\omega=+j\infty}\left[\frac{f'(j\omega)}{f(j\omega)}\right]d(j\omega) \quad (21)$$

and Nyquist's criterion follows showing that by plotting, $$[f(j\omega)-1]=K\frac{D_x(j\omega)N(j\omega)}{N_x(j\omega)D(j\omega)}=KB(j\omega)G(j\omega)=U(\omega)+jV(\omega) \quad (22)$$

on the U, V plane, the sum of zeroes of $f(s)$ lying in the right half plane, each counted a number of times equal to its order, is equal to the number of encirclements of the $(-1+j0)$ point on the U, V plane. No encirclements indicates that $f(s)$ of Equation 11 represents a stable system.

To demonstrate the manner of determniing stability reference should be had to FIG. 6 wherein a simple feedback system employing a compensator of the type described is shown. The elements of the system are numbered similar to the corresponding elements of FIG. 5*a*.

Two examples of simplified systems are selected for a steady state stability study in accordance with the requirements of Equation 22 and the loci for the expressions $[B(j\omega)G(j\omega)]$ for each system are plotted for various values of $\omega$. For the systems of Examples 1 and 2, respectively, the $[B(j\omega)G(j\omega)]$ locus, or Nyquist plot is designated 36 and 37.

From Equation 22 and the preceding development, it should be apparent that all values of K such that the locus of $KB(j\omega)G(j\omega)$ does not encircle the $(-1+j0)$ point of the U+jV plane result in a stable system.

In the case of Example 1, a portion of the KBG locus is shown at 38 for a K of 3.3. Since the curve 38 passes through the $(-1+j0)$ point instability will result for all values of K in excess of 3.3 in the system of Example 1. All such higher values result in an encirclement of the critical point.

In the case of Example 2, a portion of the $KB(j\omega)G(j\omega)$ locus is shown at 39 for a K of 3.0. Since the curve 39 also passes through the $(-1+j0)$ point instability will result for all values of K in excess of 3.0 in the system of Example 2.

*Performance.*—The foregoing discussed stability. We turn now to a consideration of the performance of stable systems, and to do so, introduce the "K-circles" or the modified M-circles.

Let, $$[B(j\omega)G(j\omega)]=X(\omega)+jY(\omega)$$

Then, from Equation 10, in order that the magnitude of the gain be unity $$|F(j\omega)|=1=(1+K)\left|\frac{X(\omega)+jY(\omega)}{1+K[X(\omega)+jY(\omega)]}\right| \quad (23)$$

It follows that $$[X(\omega)-X_0(\omega)]^2+[Y(\omega)]^2=R^2$$

where $$X_0(\omega)=\frac{K}{2K+1}$$

$$R=\frac{K+1}{2K+1}$$

Equation 23 defines a system of circles in K. This system of circles is plotted in FIG. 6 together with the open loop locus $B(j\omega)G(j\omega)$. If the open loop contains a delay compensator, the $B(j\omega)G(j\omega)$ locus will, in general, be a spiral winding inward toward the origin. For values of $(j\omega)$ corresponding to low frequencies the locus of $B(j\omega)G(j\omega)$ will match or coincide with one of the K-circles. For instance, as shown in FIG. 6, the open loop locus 36 matches with the circle with K=0.333. Therefore 33.3% of the controlled variable is fed back in order to obtain a flat response. Similarly the open loop locus 37 matches with the circle with $K=0.25$. Therefore 25% of the controlled variable is fed back in order to obtain a flat response. While any value of K less than the values 3.3 and 3.0 in the Examples 1 and 2, respectively, results in a stable system, the present concern is to obtain optimum performance and this is done by selecting a K value, the circle of which most closely conforms to the $B(j\omega)G(j\omega)$ locus. The resulting characteristics are shown in FIG. 7 where once again curves 30 and 31 represent ideal performance. It is important to note that the feedback arrangement effects a material improvement in performance and is not merely limited to a correction of bias errors.

For actual computations, a somewhat more convenient procedure is to use the $$\left[\frac{1}{B(j\omega)G(j\omega)}\right]$$

plane.

*Short-time memory units in feedforward-feedback systems*

FIGS. 8(*a*) through 8(*d*) show a group of feedforward-feedback systems.

*Stability.*—The stability of each of these four circuits will be discussed. Starting with FIG. 8(*a*), $$q(s)=\left[\frac{J(s)G_1(s)+B(s)G_2(s)}{1+H(s)B(s)G_2(s)}\right]v(s) \qquad (24)$$

Here, we have two non-interacting paths the outputs of which add to produce the controlled variable, $q$.

The open-loop circuit has the transfer function $$J(s)G_1(s)=\frac{D_{Jx}(s)}{N_{Jx}(s)}\cdot\frac{N_1(s)}{D_1(s)} \qquad (25)$$

The individual terms on the right are analytic, contain no poles and contain no zeros in the right half plane, and so $J(s)G_1(s)$ represents a stable open-loop system.

The closed-loop transfer function is $$\frac{B(s)G_2(s)}{1+H(s)B(s)G_2(s)}=\frac{1}{N_x(s)D_2(s)}\cdot\frac{D_x(s)N_2(s)}{\left[1+H(s)\frac{D_x(s)N_2(s)}{N_x(s)D_2(s)}\right]} \qquad (26)$$

Individual terms, or functions of $s$, are assumed to have the same characteristics as those first ascribed to the terms of Equation 25. Hence, so far as stability is concerned, we need consider only the bracketed term in the denominator. If we make $H(s)=K$ the whole stability problem for Equation 24 becomes identical to that of the feedback system described by Equation 10.

For the system shown in FIG. 8(*b*), $$q(s)=\left[\frac{[J(s)+B(s)]G(s)}{1+H(s)B(s)G(s)}\right]v(s) \qquad (27)$$

Assuming $H(s)=K$ and recognizing that, the remainder of the letters designate functions of $s$ as before, $$q(s)=\left[\frac{[N_x(s)D_{Jx}(s)+N_{Jx}D_x(s)]N(s)}{N_{Jx}(s)N_x(s)D(s)\left\{1+K\frac{D_x(s)N(s)}{N_x(s)D(s)}\right\}}\right]v(s) \qquad (28)$$

With the same assumptions as were made previously with respect to the functions of $s$, stability again depends only on the bracketed term in the denominator.

Next, consider FIG. 8(*c*) with $H(s)=K$, $$q(s)=\left[\frac{J(s)G_1(s)+B(s)G_2(s)}{1+H(s)[J(s)G_1(s)+B(s)G_2(s)]}\right]v(s) \qquad (29)$$

$$q(s)=\left[\frac{D_{Jx}(s)N_x(s)D_2(s)N_1(s)+D_x(s)N_{Jx}(s)D_1(s)N_2(s)}{N_{Jx}(s)D_1(s)N_x(s)D_2(s)\left\{1+K\left[\frac{D_{Jx}(s)N_1(s)}{N_{Jx}(s)D_1(s)}+\frac{D_x(s)N_2(s)}{N_x(s)D_2(s)}\right]\right\}}\right]v(s) \qquad (30)$$

And, for stability we are concerned only with the outer-bracketed group of terms in the denominator.

Finally, consider FIG. 8(*d*), letting $H(s)=K$ $$\left.\begin{aligned}q(s)&=\left[\frac{\{J(s)+B(s)\}G(s)}{1+H(s)[J(s)+B(s)]G(s)}\right]v(s)\\ q(s)&=\left[\frac{[D_{Jx}(s)N_x(s)+N_{Jx}(s)D_x(s)]N(s)}{N_{Jx}(s)N_x(s)D(s)\left\{1+K\left[\frac{D_{Jx}(s)N_x(s)+N_{Jx}(s)D_x(s)}{N_{Jx}(s)N_x(s)}\right]\right\}\frac{N(s)}{D(s)}}\right]v(s)\end{aligned}\right\} \qquad (31)$$

Stability depends only on the bracketed term in the denominator.

In these four cases it was assumed that $H(s)=K$, just to reduce the problem to a form discussed earlier (Equation 10). This was not necessary. It should be apparent that $H(s)$ could be used as a variable in $s$ and the same general procedures would be followed.

These illustrations of feedforward-feedback systems are intended to convey the truly broad character of the invention as applied to the control system art and should not be construed as limiting the invention. It is believed that the present invention permits a short time memory unit to be employed in any closed loop by employing an appropriate value for K and $H(s)$.

It should be understood that the description of the preferred form of the invention is for the purpose of complying with section 112, title 35 of the U.S. Code and that the appended claims should be construed as broadly as the prior art will permit.

*List of symbols*

$t$=the independent variable, time.

$T_1, T_2, \ldots T_n$ etc.=fixed values of time delay.

$T_d$=maximum time delay of the short-time memory device.

$s$=complex variable of the La Place transform calculus $s=r\epsilon^{j\theta}$, where $r$=magnitude, $\theta$=angle, and $j=+\sqrt{-1}$, $\epsilon$=2.7183=Naperian Base $\omega$=angular velocity=[$2\pi$ (frequency)]

$\mu$=a real or else complex root of $D(s)=0$

Variables which are functions of time:

- $v(t)$=command function, or input, as an instantaneous function of time, $t$.
- $q(t)$=controlled variable, or else indirectly controlled variable, which can also be called the output or response and, as shown here, it is an instantaneous function of time.
- $v(s)$=La Place transform of $v(t)$
- $q(s)$=La Place transform of $q(t)$
- $v(j\omega)$=steady state value of command function when it can be expressed as a function of $(j\omega)$.
- $q(j\omega)$=steady state response expressed as a function of $(j\omega)$.

Transfer functions:

$G(s)=\frac{N(s)}{D(s)}$ = transfer function for a part of the system being controlled wherein both N(s) and D(s) are polynomials in s, and wherein the degree of N(s) is, in general, less than or, at most, equal to that of D(s).

Other transfer functions can be used: such as $G_1(s)$ for another part of a system being controlled, or $G_2(s)$ for still another part of a system being controlled, and then, $$G_1(s)=[N_1(s)/D_1(s)]$$

and $$G_2(s)=[N_2(s)/D_2(s)]$$

$B(s)=\frac{D_x(s)}{N_x(s)}$ = La Place transfer function for the compensator wherein $N_x(s)$ is a polynominal in s and $$\left(\frac{1}{N_x(s)}\right)$$

arises, in general, from a passive, lumped constant, specially designed section of the compensator such that $N_x(s)\approx N(s)$; and wherein $D_x(s)$ is a finite sum of transcendental functions of s, as will be further set forth below. Thus, $D_x(s)$ is the transfer function for the short-time memory device acting in conjunction with its output amplifiers and summing device.

Other terms used are the following:

For another compensator, $$J(s)=[D_{Jx}(s)/N_{Jx}(s)]$$

H(s) = a La Place transfer function for equipment in a feedback path.

Other more general function of s are the following:

$f(s)$ and $f'(s)$ where $f'(s)=(df(s)/ds)$

Other functions: $X(\omega)$, $Y(\omega)$, $U(\omega)$, $V(\omega)$, $A(\omega)$, $B(\omega)$, $a(\omega)$, $b(\omega)$, $F(j\omega)$; and also F(s) and its argument $(\psi_b-\psi_a)$, are defined where used.

Subscripts:

1, 2, . . . l, m, n, k are all positive integers. In one instance a and b are used as subscripts to indicate the start and finish of a line integral.

Parameters and other symbols:

$a_n$, $B_k$, K, $b_m$, R, $A_m$ are all real numbers but defined in part by usage in the text.

M = a real positive number used to signify the magnitude of $F(j\omega)$ $\int_c$ is employed to indicate integration around a closed path.

ln = logarithm to the base $\epsilon$.

In the appended claims, certain expressions are used which are given the connotations set forth below:

The term "part of the system being controlled" applies to equipment which in itself has a single input signal and a single output signal and with which the SCC arrangement and device is cascaded with the part of the system being controlled at the input point, or at the output point, or at any point within the part of the system being controlled.

In contrast with the term "part of the system being controlled," another term is used and this term is "other physical apparatus." The term "other physical apparatus" applies to equipment which has a single input signal and which has a single output signal but with which the SCC arrangement and device is not cascaded.

The term "total system being controlled" applies to the entire assembly of equipment which forms the feedback or else the feedforward-feedback control system. The term "total feedback control system" applies to the entire assembly of equipment which forms the feedback control system.

The "total system being controlled" and the "total feedback control system" must contain one or more parts of the systems being controlled to come within the scope of this invention, and if there is only one part of the system being controlled it must contain also other physical apparatus. If said system contains more than one part of the system being controlled then it may or may not contain other physical apparatus.

The expression "altering the value" as applied to the signals referred to in the claims contemplates changing the sign and/or the magnitude of such signals.

We claim:

1. In a feedback control system of the type having a closed loop containing therewithin a part of the system being controlled, said part of the system being controlled having a transfer function, G(s), an arrangement for controlling output from said part in response to input to said system so that said output is substantially a specified function of said input, said arrangement including signal component control means in said loop for delaying a signal passing through said part different intervals of time to produce a plurality of signal components and including means for altering the value of at least some of said signal components and means for summing said signal components to provide a composite signal containing components characterized by discrete time delays and changed values in accordance with a transfer function B(s), said loop including means for providing a feedback element of gain K of a value to maintain stability in the presence of components of said composite signal separated by discrete time delays so that said system including said loop has a transfer function of $$\left[\frac{B(s)G(s)}{1+KB(s)G(s)}\right]$$

for which a Nyquist plot of $[KB(j\omega)G(j\omega)]$ does not encircle the point, minus one, of its complex plane.

2. In a feedback control system of the type having a closed loop containing therewithin a part of the system being controlled, said part of the system being controlled having a transfer function, G(s), an arrangement for controlling output from said part in response to input to said system so that said output is substantially a specified function of said input, said arrangement including signal component control means in said loop and including an electrical delay network having series and shunt circuit elements in cascade connection for delaying a signal passing through said part different intervals of time to produce a plurality of signal components and including means for altering the value of at least some of said signal components and means for summing said signal components to provide a composite signal having components distinguishable by discrete time delays and changed values in accordance with a transfer function B(s), said loop including means for providing in the feedback path other physical apparatus, said apparatus having a transfer function, H(s), such that the feedback control system has a transfer function $$\left[\frac{B(s)G(s)}{1+H(s)B(s)G(s)}\right]$$

for which a Nyquist plot of $[H(j\omega)B(j\omega)G(j\omega)]$ does not encircle the point, minus one, of its complex plane, and system stability is maintained in the presence of components of said composite signal wherein said components are separated by discrete time delays.

3. The method of control in a feedback control system of the type having a closed loop containing therewithin a part of the system being controlled, said part of the system being controlled having a transfer function, $G(s)$, and said method being adapted to control output from said forward path in response to input to said system to provide output that is substantially a specified function of said input and including the steps for generating in said loop from a signal passing therethrough a plurality of component signals delayed one from the other by discrete time intervals and modified in value in dependence upon a transfer function $B(s)$, producing a composite signal in said loop dependent upon the combination of said delayed and modified component signals, and feeding a signal back around said loop such that the feedback control system has a transfer function of $$\left[\frac{B(s)G(s)}{1+H(s)B(s)G(s)}\right]$$

for which $H(s)$ has a value so that a Nyquist plot of $[H(j\omega)B(j\omega)G(j\omega)]$ does not encircle the point, minus one, of its complex plane.

4. In a feedback control system having a closed loop that comprises a forward path containing a part of the system being controlled characterized by a transfer function $G(s)$ and a feedback path containing other physical apparatus, an arrangement for controlling output from said forward path in response to input to said system so that said output is substantially a specified function of said input, said arrangement including signal component control means in said loop for delaying a signal passing through said forward path different intervals of time to produce a plurality of signal components, and including means for altering the value of at least some of said signal components and means for summing said signal components to provide a composite signal having components distinguishable by discrete time delays and changed values in accordance with a transfer function $B(s)$, with said other physical apparatus providing only amplification to provide a feedback element of gain, K, of a value to maintain stability in the presence of components of said composite signal separated by discrete time delays so that said control system has a transfer function of $$\left[\frac{B(s)G(s)}{1+KB(s)G(s)}\right]$$

wherein a Nyquist plot of $[KB(j\omega)G(j\omega)]$ does not encircle the point, minus one, of its complex plane.

5. In a feedback control system of the type having a closed loop comprising a forward path containing a part of the system being controlled and said part being controlled characterized by a transfer function $G(s)$, and a feedback path containing other physical apparatus, an arrangement for controlling output from said system in response to input to said system so that said output is substantially a specified function of said input, said arrangement including signal component control means in said loop for delaying a signal passing through said forward path different intervals of time to produce a plurality of signal components and including means for altering the value of at least some of said signal components and means for summing said signal components to provide a composite signal having components characterized by discrete time delays and changed values in accordance with a transfer function $B(s)$, with said other physical apparatus providing a feedback transfer function $H(s)$ around said loop of a value to maintain stability in the presence of components of said composite signal separated by discrete time delays so that said control system has a transfer function $$\left[\frac{B(s)G(s)}{1+H(s)B(s)G(s)}\right]$$

wherein $H(s)$ is of such value that a Nyquist plot of $[H(j\omega)B(j\omega)G(j\omega)]$ does not encircle the point, minus one, of its complex plane.

6. In a feedback control system of the type having a single loop comprising a forward path containing a part of the system being controlled characterized by a transfer function $G_1(s)$ and a feedback path containing another part of the system being controlled, an arrangement for controlling output from said forward path in response to input to said system so that said output is substantially a specified function of said input, said arrangement including signal component control means in said forward path for delaying a signal passing through said first named part different intervals of time to produce in said forward path a plurality of signal components and including means for altering the value of at least some of said signal components and means for summing said signal components to provide a composite signal having components distinguishable by discrete time delays and changed values in accordance with a transfer function $B_1(s)$, and said another part providing a feedback transfer function $B_2(s)\ G_2(s)$ of a value to main stability in the presence of components of said composite signal separated by discrete time delays so that said control system has a transfer function $$\left[\frac{B_1(s)G_1(s)}{1+B_2(s)G_2(s)B_1(s)G_1(s)}\right]$$

for which $[B_2(j\omega)G_2(j\omega)B_1(j\omega)G_1(j\omega)]$ is of such value that a Nyquist plot does not encircle the point, minus one, of its complex plane.

7. In a total feedback control system having a closed loop that comprises: a forward path containing a part of the system being controlled, said part characterized by a transfer function $G(s)$; a feedback path containing other physical apparatus, said apparatus characterized by a transfer function, K; and a preamplifying element of gain, $(1+K)$, for an input signal, $v$, such that the input to the closed loop, or feedback control system, is $[(1+K)v]$, an arrangement for controlling the output of the total feedback control system output in response to the total feedback control system input $v$, so that the said output is substantially a specified function of the said input, said arrangement including means for preamplifying said input signal, $v$, to yield $[(1+K)v]$ as the input to the loop, or feedback control system, signal component control means in said loop for delaying a signal passing through said forward path different intervals of time to produce a plurality of signal components and including means for altering the value of at least some of said signal components and means for summing said signal components to provide a composite signal having components distinguishable by discrete time delays and changed values, in accordance with a transfer function $B(s)$, said other physical apparatus having a transfer function K so that said total feedback control system has a transfer function characterized as $$\left[\frac{B(s)G(s)(1+K)}{1+KB(s)G(s)}\right]$$

(wherein $K\neq 0$, but $-1\leq K\leq 1$) to provide a gain around the loop of a value to maintain stability of said total feedback control system with a Nyquist plot of $$[KB(j\omega)G(j\omega)]$$

not encircling the point, minus one, of its complex plane and to provide said control system with substantially flat amplitude response over a wide frequency band.

8. In a total feedback control system of the type having a closed loop comprising a forward path containing a part of the system being controlled characterized by a transfer function $G(s)$; a feedback path containing other physical apparatus; and a preamplifying device for an input signal, $v$, said device having a gain $(1-K)$; an arrangement for controlling output from said forward path in response to input to said total feedback control system so that said output is substantially equal to a specified function of said input, said arrangement including means for preamplifying said input to a signal $[(1+K)v]$, a signal component control means in said loop for delaying a signal passing therethrough different intervals of time to produce a plurality of signal components, and including means for altering the value of at least some of said signal components and means for summing said signal components to provide a composite signal having components distinguishable by discrete time delays and changed values in accordance with a transfer function $B(s)$, other physical apparatus in the feedback path having a transfer function, $H(s)$, such that said total feedback control system has a transfer function characterized as $$\left[\frac{B(s)G(s)(1+K)}{1+H(s)B(s)G(s)}\right]$$

(wherein $K \neq 0$, but $-1 \leqq K \leqq 1$), to provide a gain around the loop of a value to maintain stability of said total feedback control system with the Nyquist plot of $$[H(j\omega)B(j\omega)G(j\omega)]$$

not encricling the point, minus one, of its complex plane, and to provide said control system with substantially flat amplitude response over a wide frequency band.

9. In a total system being controlled, said system including multiple closed loops defining a number of forward and feedback paths and said system including in said loops parts of a system being controlled, each such part being in one of said paths of the total system and having a single input signal and a single output signal, and having a transfer function $G_n(s)$, means for controlling output from each such part in response to input thereto and thereby comprising signal component control means connected in the loop that contains such part for delaying a signal passing through such part different intervals of time to produce a plurality of signal components and including means for altering the value of at least some of said signal components and means for summing said signal components to provide a composite signal having components distinguishable by discrete time delays and changed values in accordance with a transfer function $B_n(s)$, each such closed loop including means for providing a gain therearound of a value such that a Nyquist plot for such loop does not encircle the point, minus one, of its complex plane to thereby maintain stability for the total feedback control system.

UNITED STATES PATENTS

References Cited in the file of this patent

| | | |
|---|---|---|
| 2,503,868 | Gaumer | Apr. 11, 1950 |
| 2,650,332 | Bordewieck | Aug. 25, 1953 |

UNITED STATES PATENT OFFICE

CERTIFICATION OF CORRECTION

Patent No. 3,010,035 November 21, 1961

John F. Calvert et al.

It is hereby certified that error appears in the above numbered patent requiring correction and that the said Letters Patent should read as corrected below.

Column 3, line 18, for "$N_x(s)=N(s)$" read -- $N_x(s)\approx N(s)$ --; line 42, the formula should appear as shown below instead of as in the patent:

$$N_x(s)=b_0'+b_1's+b_2's^2+\ldots+b_m's^m$$

same column 3, line 46, the formula should appear as shown below instead of as in the patent:

$$b_0\approx b_0',\ b_1\approx b_1',\ \ldots,\ b_m\approx b_m' \text{ and } k\geqq n\geqq m$$

column 7, equation (18) should appear as shown below instead of as in the patent:

$$f(r\varepsilon^{j\theta})=1+A_m\varepsilon^{j\rho}$$

column 8, line 5, for "$(\varphi_b-\varphi_a)$" read -- $(\psi_b-\psi_a)$ --; column 14, line 70, for "(1-K)" read -- (1+K) --; column 16, line 8, after "the" insert -- closed --.

Signed and sealed this 22nd day of May 1962.

(SEAL)
Attest:

ERNEST W. SWIDER
Attesting Officer

DAVID L. LADD
Commissioner of Patents